United States Patent
Luo et al.

(10) Patent No.: US 10,423,210 B2
(45) Date of Patent: Sep. 24, 2019

(54) AUTOMATIC DETECTION OF VOLTAGE REGULATOR PHASE ASSIGNMENT AND CONFIGURATION FOR MULTI-OUTPUT RAILS

(71) Applicant: DELL PRODUCTS, L.P., Round Rock, TX (US)

(72) Inventors: Shiguo Luo, Austin, TX (US); Kejiu Zhang, Round Rock, TX (US); Ralph H. Johnson, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 59 days.

(21) Appl. No.: 15/627,193

(22) Filed: Jun. 19, 2017

(65) Prior Publication Data

US 2018/0364784 A1 Dec. 20, 2018

(51) Int. Cl.
| | |
|---|---|
| G06F 1/3206 | (2019.01) |
| G05B 15/02 | (2006.01) |
| G06F 13/40 | (2006.01) |
| G06F 1/3296 | (2019.01) |
| G06F 1/3287 | (2019.01) |

(52) U.S. Cl.
CPC ........... *G06F 1/3206* (2013.01); *G05B 15/02* (2013.01); *G06F 1/3287* (2013.01); *G06F 1/3296* (2013.01); *G06F 13/4022* (2013.01); *G06F 13/4072* (2013.01)

(58) Field of Classification Search
CPC .... G06F 1/3206; G06F 1/3287; G06F 1/3296; G06F 13/4022; G06F 13/4072; G05B 15/02
See application file for complete search history.

(56) References Cited

U.S. PATENT DOCUMENTS

| | | | |
|---|---|---|---|
| 8,063,619 B2 | 11/2011 | Zhu et al. | |
| 9,612,638 B1 | 4/2017 | Berke et al. | |
| 2002/0163376 A1* | 11/2002 | Pappalardo | H02M 3/07 327/536 |
| 2004/0150928 A1* | 8/2004 | Goodfellow | H02M 3/1584 361/90 |
| 2014/0108846 A1 | 4/2014 | Berke et al. | |
| 2014/0344600 A1* | 11/2014 | Breen | H02M 3/1584 713/323 |
| 2016/0033611 A1 | 2/2016 | Rahardjo et al. | |
| 2016/0233766 A1 | 8/2016 | Todorov et al. | |

* cited by examiner

*Primary Examiner* — Austin Hicks
(74) *Attorney, Agent, or Firm* — Isidore PLLC

(57) ABSTRACT

A multiphase voltage regulator (VR) has a VR controller that performs automatic VR phase assignment and configuration for single or multi-output rails of an Information Handling System (IHS). VR power circuit has power stages selectably coupled to output voltage connection(s) or rail(s) that deliver electrical energy to information handling resource(s). VR controller is coupled to the VR power circuit and provides a first reference voltage (IREF) signal to the VR power circuit. VR controller identifies any power stages that return a load current monitor (IMON) signal that indicates that the respective power stage is coupled to the first IREF signal. VR controller regulates identified power stages of the VR power circuit during delivery of electrical power to information handling resource(s). Regulation is according to a VR configuration that is selected based on identified VR phases assigned to a first output voltage loop and associated with the first IREF signal.

20 Claims, 10 Drawing Sheets

AUTOMATIC DETECTION OF VOLTAGE REGULATOR PHASE ASSIGNMENT AND CONFIGURATION FOR MULTI-OUTPUT RAILS

BACKGROUND

1. Technical Field

The present disclosure relates in general to digital control of a voltage regulator (VR), and more particularly to configuration control of a multi-phase VR of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may include a voltage regulator to provide a constant voltage level and a current to power the system. For example, a voltage regulator may receive an input voltage and produce an output current at a predetermined output voltage required by a load for which the voltage regulator is providing power. Many voltage regulators are capable of operating in multiple phases, where a phase for a voltage regulator may typically refer to combining a driver and a power stage to form one phase. Thus, a multiphase voltage regulator may include multiple instances of such combinations. Oftentimes, an information handling system may require multiple voltage rails to power components requiring different power supply voltages. Traditionally, such requirements have been satisfied by providing a stand-alone voltage regulator for each such rail. To enable many configurations of components within an IHS, each voltage regulator would typically include a number of phases to ensure that the voltage regulator can meet power requirements of the components to which power is supplied on each rail. Complexity and cost is incurred when loads are selectable by the manufacturer or user and that consequently require a specifically selected and configured multiphase regulator, which provides appropriate power levels and regulation for the selected load.

BRIEF SUMMARY

In accordance with the teachings of the present disclosure, an information handling system (IHS) includes at least one information handling resource. A multiphase voltage regulator (VR) has a VR power circuit that includes two or more power stages. The power stages are selectably coupled to one or more output voltage connections that deliver electrical energy to the at least one information handling resource. The multiphase VR includes a VR controller that is coupled to the VR power circuit. The VR controller provides a first reference voltage (IREF) signal to the VR power circuit. The VR controller identifies any of the two or more power stages that returns a load current monitor (IMON) signal that indicates that the respective power stage is coupled to the first IREF signal. The VR controller regulates the identified power stages of the VR power circuit during delivery of electrical power to the at least one information handling resource. The regulation by the VR controller is according to a VR configuration that is selected based on the identified power stages being VR phase assigned to a first output voltage loop and associated with the first IREF signal.

In accordance with embodiments of the present disclosure, a circuit board assembly includes at least one information handling resource of an IHS attached to a circuit board substrate. A multiphase VR has a VR power circuit that includes two or more power stages that are selectably coupled to one or more output voltage connections that deliver electrical energy to the at least one information handling resource. The multiphase VR includes a VR controller that is coupled to the VR power circuit. The VR controller provides a first reference voltage (IREF) signal to the VR power circuit. The VR controller identifies any of the two or more power stages that return a load current monitor (IMON) signal that indicates that the respective power stage is coupled to the first IREF signal. The VR controller regulates the identified power stages of the VR power circuit during delivery of electrical power to the at least one information handling resource. The regulation by the VR controller is according to a VR configuration that is selected based on the identified power stages being VR phase assigned to a first output voltage loop and associated with the first IREF signal.

According to illustrative embodiments of the present disclosure, a method includes providing, by a VR controller, a first IREF signal to a VR power circuit of a multiphase VR. The VR power circuit has two or more power stages. The power stages are selectably coupled to one or more output voltage connections that deliver electrical energy to at least one information handling resource of an IHS. The method includes identifying any of the two or more power stages that return an IMON signal that indicates that the respective power stage is coupled to the first IREF signal. The VR controller regulates the identified power stages of the VR power circuit during delivery of electrical power to the at least one information handling resource. The regulation is according to a VR configuration that is selected based on the identified power stages being VR phase assigned to a first output voltage loop and associated with the first IREF signal.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
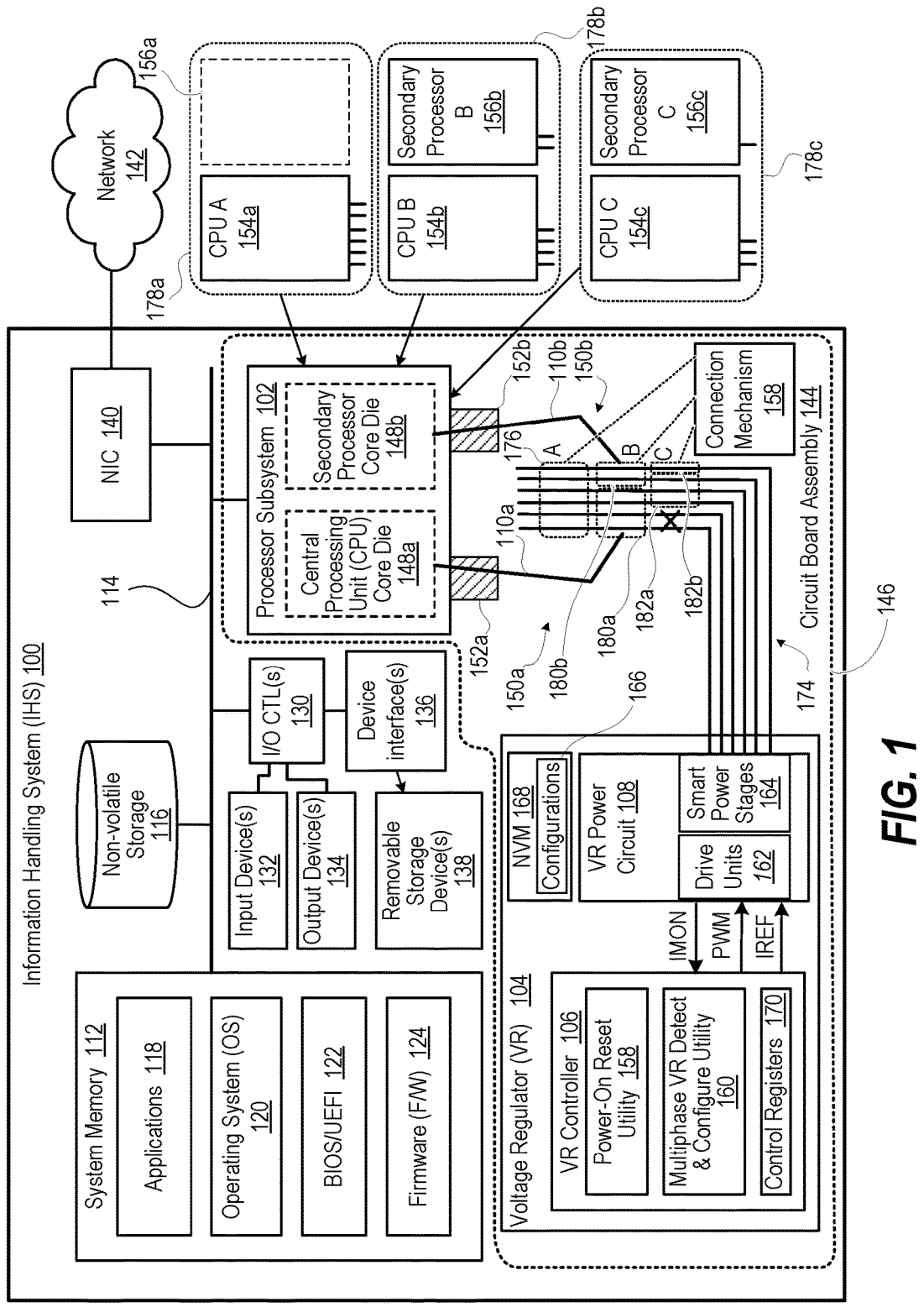
FIG. 1 illustrates a block diagram representation of an example information handling system (IHS) having computing components that are powered by a voltage regulator (VR) module, according to one or more embodiments.

A voltage regulator (VR) controller performs automatic VR phase assignment and configuration for single or multi-output rails of an Information Handling System (IHS). A multiphase VR has a VR power circuit that includes two or more power stages selectably coupled to one or more output voltage connections or rails that deliver electrical energy to at least one information handling resource of the IHS. A VR controller of the multiphase VR is coupled to the VR power circuit. The VR controller provides a first reference voltage (IREF) signal to the VR power circuit. The VR controller identifies any of the two or more power stages that returns a load current monitor (IMON) signal that indicates that the respective power stage is coupled to the first IREF signal. The VR controller regulates the identified power stages of the VR power circuit during delivery of electrical power to the at least one information handling resource. The regulation is according to a VR configuration that is selected based on the identified VR phases assigned to a first output voltage loop and associated with the first IREF signal.

In an exemplary embodiment, the present disclosure addresses an opportunity to use a single 2-loop multi-phase VR controller with flexible phase assignment to power 2 rails. A printed circuit board (PCB) layout solution for central processing unit (CPU) power distribution would have 2 voltage planes with a connection mechanism to connect the appropriate VR phase outputs to the correct rail based on the CPU to be used. The VR processor performs a method to detect the required VR phase arrangement based on the active hardware connection and to configure the VR controller to operate with the given hardware setup. The dynamic phase assignment detection and VR configuration solution: (i) is automatically performed by the VR controller; (ii) does not impact VR output voltage rail start-up time; and (iii) and does not require an additional cost or complexity increase to the VR controller or total VR solution. In particular, the present innovation can address any total number of available phases from the VR controller that require proper detection and set-up for operation. The present innovation can be extended to output voltage loop counts that are greater than 2.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100 having computing components such as a processor subsystem 102 that are powered by a multiphase voltage regulator (VR) 104. A VR controller 106 of the multiphase VR 104 performs automatic VR phase assignment and configuration for regulating a VR power circuit 108 that delivers power via single or multi-output rails 110a, 110b of the IHS 100. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, IHS 100 includes the processor subsystem 102 coupled to a system memory 112 via a system interconnect 114. System interconnect 114 can be interchangeably referred to as a system bus, in one or more embodiments. Also coupled to system interconnect 114 is non-volatile storage (e.g., a non-volatile random access memory (NVRAM)) 116, within which can be stored one or more software and/or firmware modules and one or more sets of data that can be utilized during operations of management IRS 100. These one or more software and/or firmware modules can be loaded into system memory 112 during operation of management IHS 100. Specifically, in one embodiment, system memory 112 can include therein a plurality of such modules, including one or more of application(s) 118, operating system (OS) 120, basic input/output system (BIOS) or Uniform Extensible Firmware Interface (UEFI) 122, and firmware (F/W) 124. These software and/or firmware modules have varying functionality when their corresponding program code is executed by processor subsystem 102 or secondary processing devices within management IHS 100. For example, application(s) 118 may include a word processing application, and a presentation application among other applications.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a USB, a card reader, Personal Computer Memory Card International Association (PCMCIA) slot, and/or a high-definition multimedia interface (HDMI), can be associated with IRS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100. These devices, services, and components can interface with IHS 100 via an external network, such as example network 142, using one or more communication protocols that include transport control protocol/Internet protocol (TCP/IP) and network block device (NBD) protocol. Network 142 can be a local area network, wide area network, personal area network, and the like, and the connection to and/or between network and IHS 100 can be wired, wireless, or a combination thereof. For purposes of discussion, network 142 is indicated as a single collective component for simplicity. However, it should be appreciated that network 142 can comprise one or more direct connections to other devices as well as a more complex set of interconnections as can exist within a wide area network, such as the Internet.

In one or more embodiments, a circuit board assembly 144 of the IHS 100 includes at least one information handling resource, such as the processor subsystem 102 that is attached to a circuit board substrate 146. In one or more embodiments, the processor subsystem 102 can include a central processing unit (CPU) core die 148a powered by the a first output voltage loop 150a that includes the first output connection or rail 110a. At least a portion of the first output voltage loop 150a can be formed on the circuit board substrate 146 as a first voltage plane 152a that is in electrical connection to the CPU core die 148a. The processor subsystem 102 can include a secondary processor core die 148b powered by a second output voltage loop 150b that includes the second output connection or rail 110b. At least a portion of the second output voltage loop 150b can be formed on the circuit board substrate 146 as a second voltage plane 152b that is in electrical connection to the secondary processor core die 148b.

The CPU core die 148a is selectively provisioned with a particular type of CPU, either CPU A 154a, CPU B 154b, or CPU C 154c, that respectively require a different number of phases for adequate power. In an illustrative example, CPUs A-C 154a-154c respectively require 6, 4 and 3 of the available 6 phases. The secondary processor core die 148b is one of: (i) left unprovisioned as indicated by dashed box 156a; and (ii) provisioned with a secondary processor 156b-156c, which has power requirements (2 and 1 phases respectively) that are compatible with the particular type of CPU A-C 154a-154c that is provisioned in the CPU core die 148a. After performing a power-on reset utility 158, the VR controller 106 executes a multiphase VR detect and configure utility 160 to accommodate how the processor subsystem 102 is provisioned. In particular, the one or more IREF signals are used to trigger drive units 162 of the VR power circuit 108. The respective smart power stages 164 respond via IMON signals and thereby provide an indication of what phases are electrically connected to respective rails 110a, 110b. Once all connected smart power phases 164 are determined, the appropriate configuration 166 from nonvolatile memory 168 can be loaded into control registers 170 to supply the proper PWM signals to the drive units 162.

The circuit board assembly 144 includes a connection mechanism 172 that can be set by the manufacturer or user to more than one configuration. Connection mechanism 172 selectively: (i) electrically connects an IREF signal to each power stage 164; and (ii) electrically connects the output voltage connection 174 of each power stage 164 to one of the first and second voltage planes 152a-152b. The connection mechanism 172 can include jumpers, metal oxide semiconductor field effect transistor (MOSFET) switches, etc. For the illustrative example, connection mechanism 172 provides configuration A 178a with an electrical connection 176 for all 6 phases for of CPU A 154a. Configuration A 178a provides no phases for the empty secondary processor core die 148b. In an alternate configuration, connection mechanism 172 can instead provide a configuration 178b with an electrical connection 180a for 4 phases and an electrical connection 180b for 2 phases respectively for CPU B 154b and the secondary processor 156b. Alternatively, the connection mechanism 172 can instead provide a configuration 178c with an electrical connection 182a for 3 phases and an electrical connection 182b for 1 phase respectively for CPU C 154c and the secondary processor 156c. In this configuration, two phases can be disconnected.

In an exemplary embodiment, the processor subsystem 102 is selected from the fourteenth generation (14G) Intel Purley platform central processing unit (CPU) portfolio. The CPU portfolio will consist of various processors that are contained in a package, which includes a CPU core die and non-CPU core die, in what Intel refers to as the Multi-Chip Package (MCP) configuration. MCP configuration includes the following:

(1) CPU;
(2) CPU-F with integrated OmniPath (StormLake) chip;
(3) CPU-P with integrated field-programmable gate array (FPGA) chip; and
(4) CPU-G with integrated graphics chip.

Some of these MCP configurations such as the CPUs-F and -P require additional input voltage rails to power the non-CPU core die. Whereas the core VCCIN rail of the CPU is high power, typically requiring 5-6 phases, these MCP rails can also present a high-power load also needing a multiphase design of 1-3 phases. However in these cases, the total package power is limited such that a high-power MCP rail is coupled with a lower power rating for the core VCCIN. Thus the required phase count for VCCIN in those cases is reduced. The result is that the total phase count for the 2 power rails remain in the 6-8 phase range.

Figure 2:
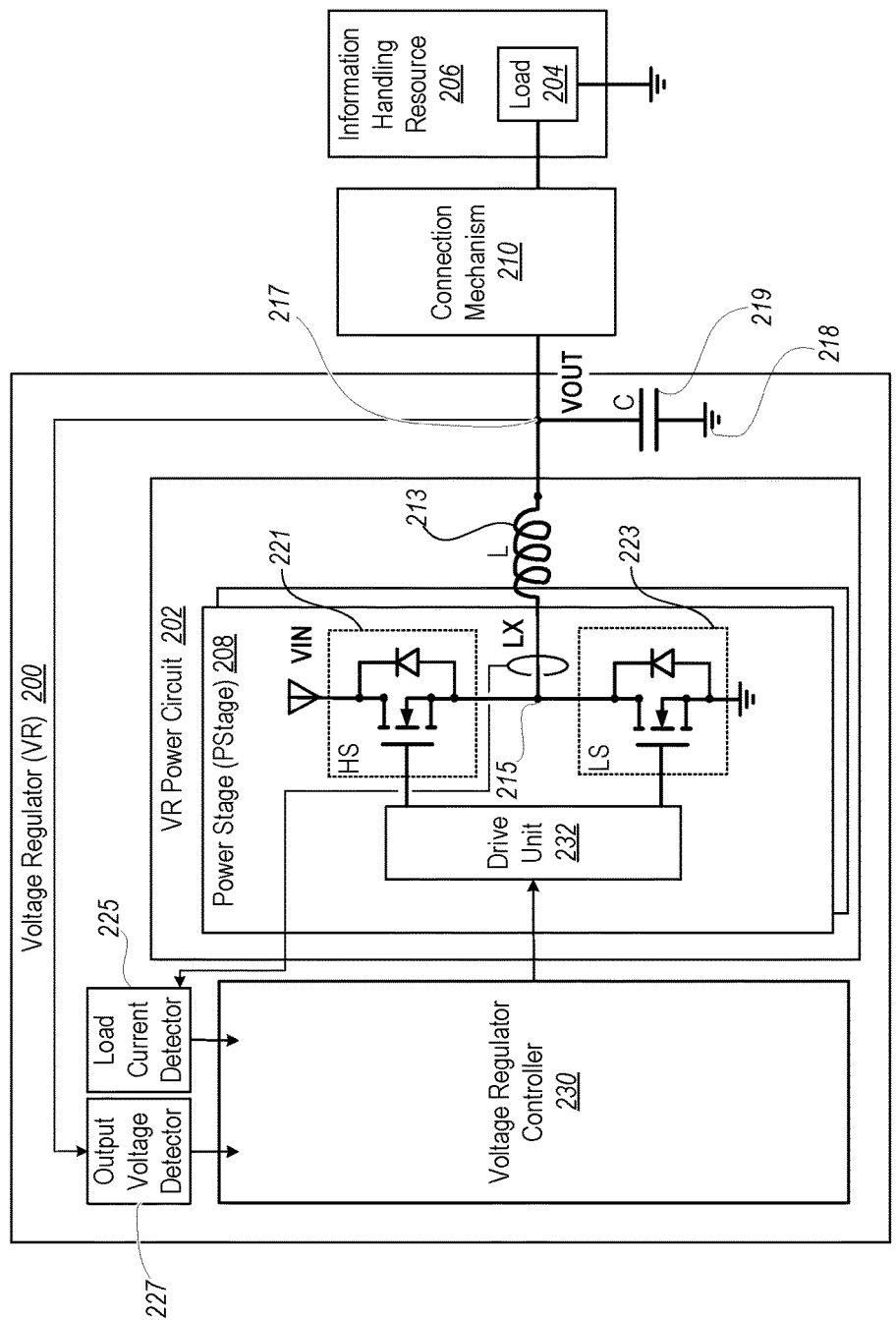
FIG. 2 illustrates a block diagram representation of an example voltage regulator of the IHS of FIG. 1, according to one or more embodiments.

FIG. 2 illustrates a voltage regulator (VR) 200 having a VR power circuit 202 that can be utilized within example IHS 100 (FIG. 1) to power a load 204 of an information handling resource 206. Each power stage (Pstage) 208 of the VR power circuit 202 can produce a desired voltage level or portion of power required for the load 204. A connection mechanism 210 electrically couples VOUT from a selected number of the power stages 208 to the load 204. In one or more embodiments, VR power circuit 202 is a synchronized Buck VR power circuit 202 that includes an inductor (L) 213 electrically connected between a phase node 215 and an output node 217. A capacitor (C) 219 is electrically connected between the output node 217 and ground (GND) 218. A high side control switch (HS) 221 is electrically connected between an input voltage from a power supply (VIN) and the phase node 215. A low side synchronous switch (LS) 223 is electrically connected between a ground (GND) 218 and phase node 215. A load current sensor 225 senses the load current value utilizing either (a) an inductor DC resistance (DCR) method or (b) an LS drain-to-source resistance in an on state RDS (on) method. An output voltage sensor 227 is electrically connected across the output node 217 and ground (GND) 218 to detect an output voltage value. VR controller 230 is placed in electrical connection with the HS 221, the LS 223, the load current sensor 225, and the output voltage sensor 227. VR controller 230 receives and/or transmits signals to/from these components to regulate the output voltage value across the capacitor 219 by switching on and off the HS 221 and LS 223 to cause an inductor current ripple through the inductor 213. Given the various transfers of signals and information, for purposes of the disclosure, the VR controller 230 is described as being in electrical communication with these various components. In one embodiment, the VR controller 230 communicates with the load current detector 225 that detects the load current value (IMON) at phase node 215. The VR controller 230 communicates with the output voltage detector 227 that detects the voltage output value of the synchronous Buck VR 204 at output node 217.

Figure 3:
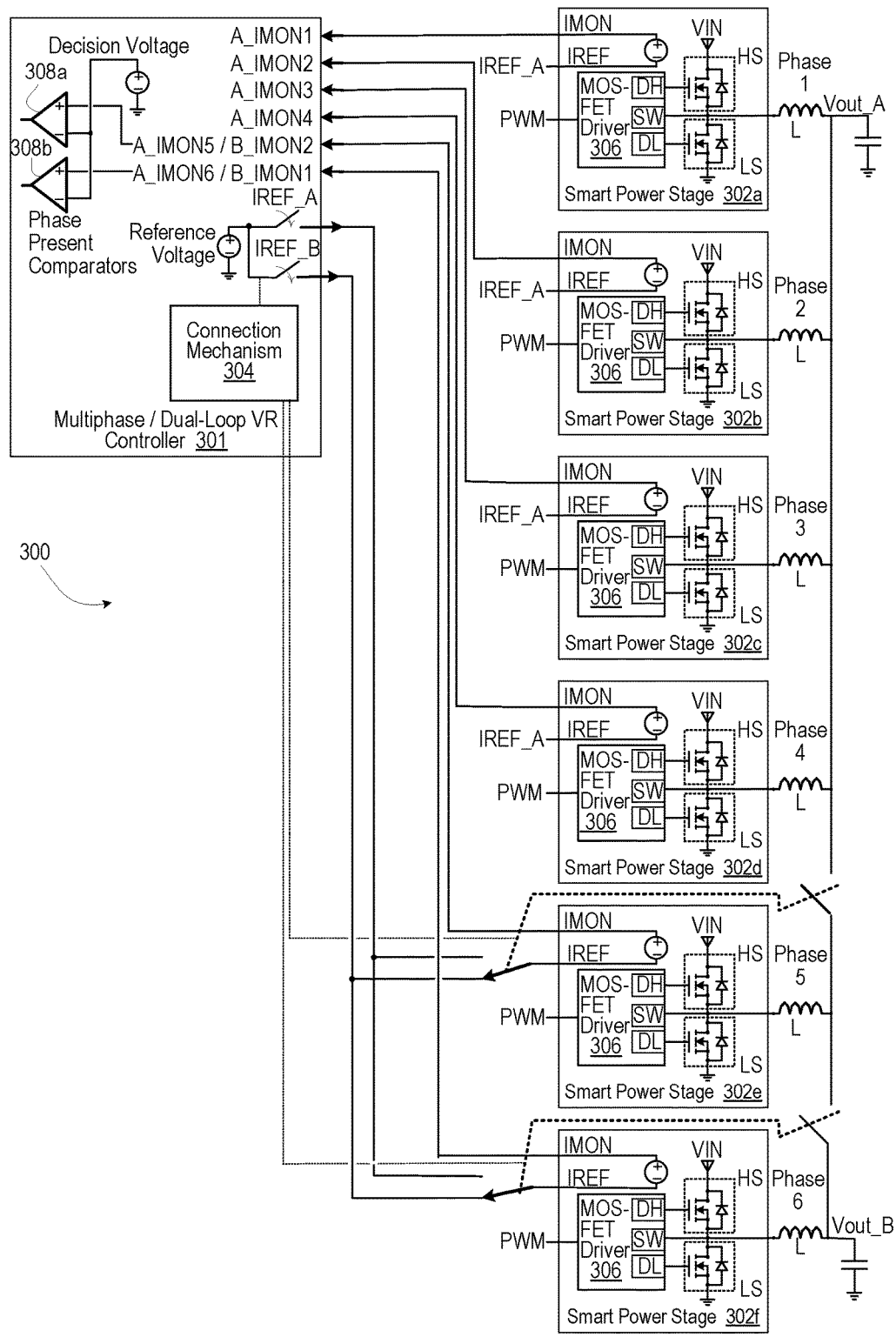
FIG. 3 illustrates a block diagram representation of an example 6-phase 2-loop VR, according to one or more embodiments.

FIG. 3 illustrates a block diagram representation of an example 6-phase 2-loop VR 300 that is controlled by a multiphase, dual-loop VR controller 301, according to one or more embodiments. Smart power stage (SPS) 302a-302f corresponds to Phases 1-6. The VR controller 301 communication with an SPS interface includes the following key point-to-point control and monitoring signals: (i) a PWM output from the VR controller 301 to the SPS 302a-302f, (ii) a reference voltage (IREF) that is output from the VR controller 301 to the SPS 302a-302f, and (iii) an IMON signal from the respective SPS 302a-302f to the VR controller 301. The latter two signals are used for detecting and configuring the phases 1-6.

The IMON signal contains the SPS MOSFET load current information that the VR controller 301 uses for load telemetry and control. The IMON output from the SPS 302a-302f is referenced to the IREF input, instead of ground, for both positive and negative current swing reporting. With the presented configuration, when the IREF voltage is present at the SPS IREF input and the SPS 302a-302f is powered, the same voltage level becomes present at the IMON output. IMON assumes the same common-mode voltage. This characteristic can be exploited by the VR controller 301 to uniquely determine if and what IREF reference voltage is applied to a given SPS 302a-302f, since the IMON signal is point-to-point between the VR controller 301 and the SPS 302a-302f. Each SPS 302a-302f that receives either IREF_A signal or IREF_B signal returns the same signal on a corresponding IMON input to VR controller 301. SPSs 302a-300d are dedicated to IREF_A and output voltage loop A (Vout A).

SPSs 302e, 302f are switchable by connection mechanism 304 to one of the following selected configuration: (i) both to IREF_A and output voltage loop A; (ii) one to IREF_A/ output voltage loop A and one to IREF_B/output voltage loop B; and (iii) both to IREF_B and output voltage loop B (Vout B). Each SPS 302a-302f includes a MOSFET driver 306 that switches the HS and LS in a way to create a regulated voltage across a corresponding inductor L. Phase presence comparators 308a, 308b receive a decision voltage and one of the IMON inputs with an output indicating a detected SPS 302a-302f that should be assigned to one of Vout A and Vout B.

SPS devices, such as those that receive a reference voltage IREF_A and IREF B, are already powered prior to VR controller power up. When the VR controller 301 receives power and comes out of its power-on-reset (POR) sequence, the VR controller 301 can enable the IREF_A output via an internal switch and then sample all configurable phase IMON inputs. Using an internal comparator 308a, 308b or similar device, the VR controller 301 can then determine which phases 1-6 are connected to loop A. If the reference voltage IREF_A is present on the given IMON input, then that phase is assigned to loop A. The VR controller 301 then moves on to enabling the switch on IREF_B. VR controller 301 samples the remaining IMON inputs to determine which of those are connected to loop B. In this 2-loop example, if there are any remaining unassigned phases, then those phases are disabled. In the configuration step, VR controller 301 then configures itself for 6+0, 5+1, 5+2, or any other detected phase configuration operation by downloading a corresponding preloaded configuration file from its nonvolatile random access memory (NVRAM) or other non-volatile storage. VR controller 301 then becomes ready to receive a VR_ENABLE signal to start-up and regulate the output rails when later enabled by the system.

VR controller 301 is powered by System Auxiliary (AUX) power domain and thus the phase assignment is determined very early and prior to System Main power enablement. VR controller 301 would perform this task as soon as VR controller 301 has completed the internal POR sequence. As a result, there is no delay to VR output rail soft-start during main power enablement due to this phase assignment discovery and configuration process by VR controller 301.

Figure 4:
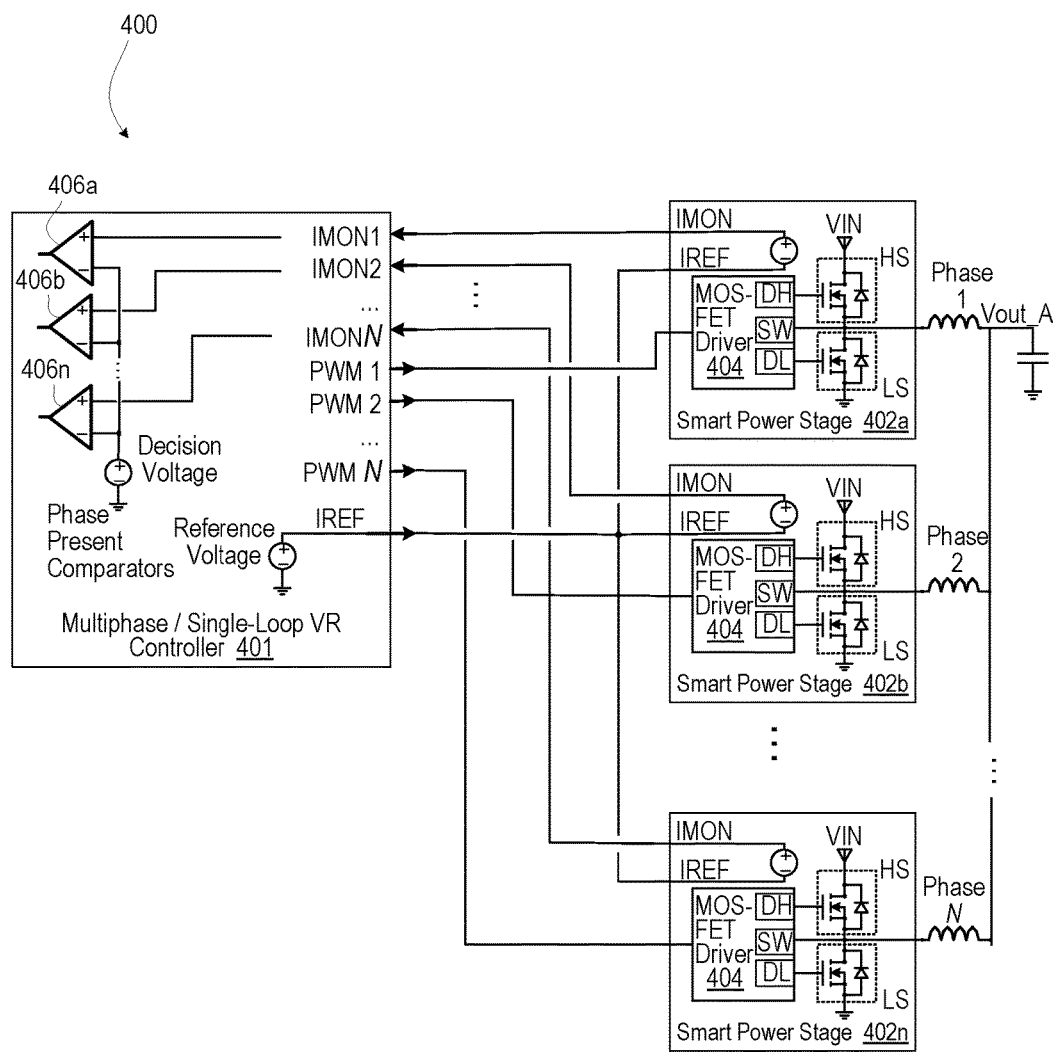
FIG. 4 illustrates a block diagram representation of an example N-phase 1-loop VR, according to one or more embodiments.

FIG. 4 illustrates an example N-phase 1-loop VR 400 having a multiphase, single-loop VR controller 401, according to one or more embodiments. VR controller 401 provides a single reference voltage IREF to SPSs 402a, 402b, . . . , 402n. VR controller 401 provides a single PWM signal to respective MOSFET driver 404 of each SPS 402a, 402b, . . . , 402n. Each SPS 402a, 402b, . . . , 402n returns a respective IMON1, IMON2, IMON N input to the VR controller 401. Each phase 1-N is either connected to Vout A or is not necessary. Using phase present comparators 406a, 406b, . . . , 406n, VR controller 401 can detect which SPSs 402a, 402b, . . . , 402n should be configured to deliver power to the single rail by downloading a corresponding configuration from internal NVRAM and disabling any non-populated phase.

Figure 5:
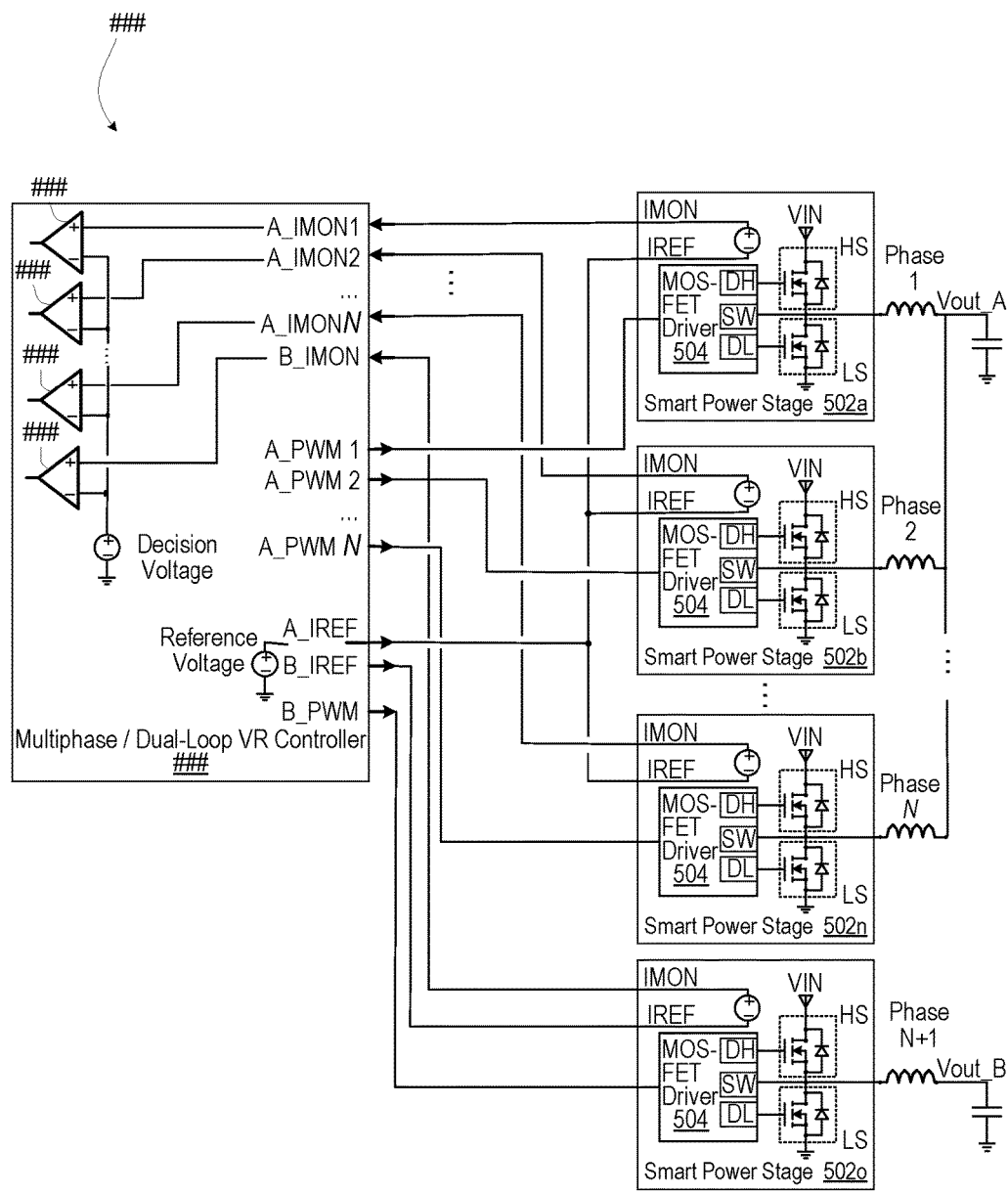
FIG. 5 illustrates a block diagram representation of an example N+1-phase 2-loop VR, according to one or more embodiments.

FIG. 5 illustrates an example N+1-phase 2-loop VR 500 having a multiphase, dual-loop VR controller 501, according to one or more embodiments. VR controller 501 provides a single reference voltage IREF_A to SPSs 502a, 502b, . . . , 502n. VR controller 501 also provides a single reference voltage IREF_B to an SPS 502o. VR controller 501 provides a single PWM signal to respective MOSFET driver 504 of each SPS 502a, 502b, . . . , 502n. Each SPS 502a, 502b, . . . 502n returns a respective IMON1, IMON2, . . . , IMON N input to the VR controller 501. Each phase 1-N is either connected to Vout A or is not necessary. Using phase present comparators 506a, 506b, . . . , 506n, VR controller 501 can detect which SPSs 502a, 502b, . . . , 502n should be configured to deliver power to the first rail. VR controller 501 can also detect that the SPS 502o is assigned to a second rail.

Figure 6:
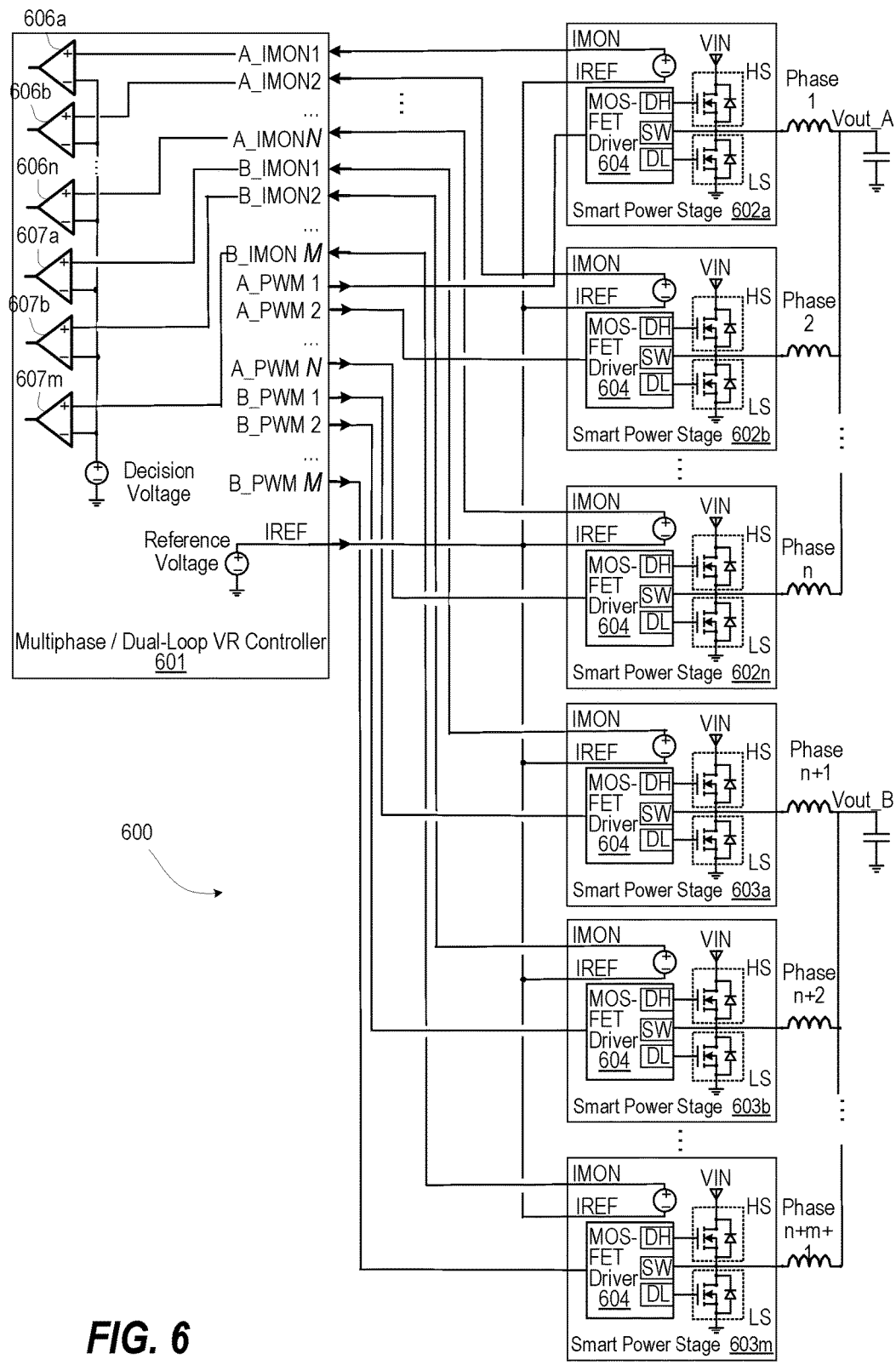
FIG. 6 illustrates a block diagram representation of an example 2-loop VR, each with N phases, according to one or more embodiments.

FIG. 6 illustrates an example 2-loop VR, each with N phases, having a multiphase, dual-loop VR controller 601, according to one or more embodiments. VR controller 601 provides a single reference voltage IREF to SPSs 602a, 602b, . . . , 602n. VR controller 601 provides a corresponding PWM signal A_PWM 1, A_PWM 2, . . . , A_PWM N to respective MOSFET driver 604 of each SPS 602a, 602b, . . . , 602n. Each SPS 602a, 602b, . . . , 602n returns a respective A_IMON1, A_IMON2, . . . , A_IMON N input to the VR controller 601. Each phase 1-N is either connected to Vout A or is not necessary. Using phase present comparators 606a, 606b, . . . , 606n, VR controller 601 can detect which SPSs 602a, 602b, . . . , 602n should be configured to deliver power to the first rail (Vout_A). VR controller 601 also provides the same single reference voltage IREF to an SPSs 603a, 603b, . . . 603m. VR controller 601 provides a corresponding PWM signal B_PWM 1, B_PWM 2, . . . , B_PWM M to respective MOSFET driver 604 of each SPS 603a, 603b, . . . , 603m. Each SPS 603a, 603b, . . . , 603m returns a respective B_IMON1, B_IMON2, . . . , B_IMON N input to the VR controller 601. Each phase 1-N is either connected to Vout A or is not necessary. Using phase present comparators 607a, 607b, . . . , 607n, VR controller 601 can detect which SPSs 603a, 603b, . . . 603m should be configured to deliver power to the second rail (Vout_B).

Figure 7:
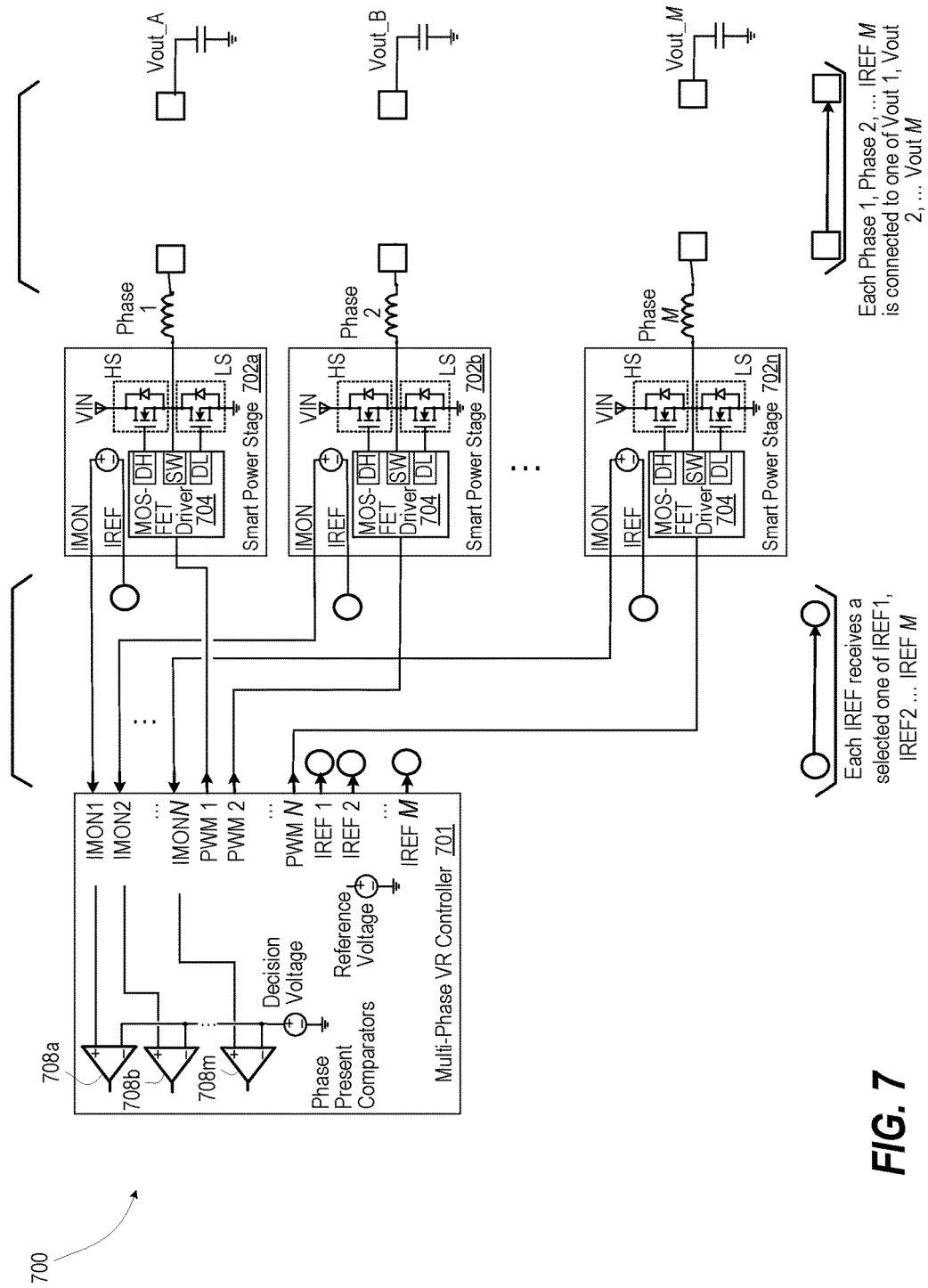
FIG. 7 illustrates a block diagram representation of an example multiphase, multi-loop VR, according to one or more embodiments.

FIG. 7 illustrates an example N-phase, M-phase VR 700, having a multiphase, multi-loop VR controller 701, according to one or more embodiments. Each SPS 702a, 702b, . . . , 702n can be selectively connected to one of reference voltages IREF 1, IREF2, IREF M and a corresponding output voltage or rail (Vout_A, Vout_B, . . . , Vout_M). Each SPS 702a, 702b, . . . , 702n responds with a corresponding IMON 1, IMON2, . . . , IMON M. Each driver 704 of each SPS 702a, 702b, . . . , 702n can also receive a corresponding PWM 1, PWM 2, . . . , PWM N. Detection of connected SPSs 702a, 702b, . . . , 702n can be made by phase present comparators 708a, 708b, . . . , 708m.

Figure 8:
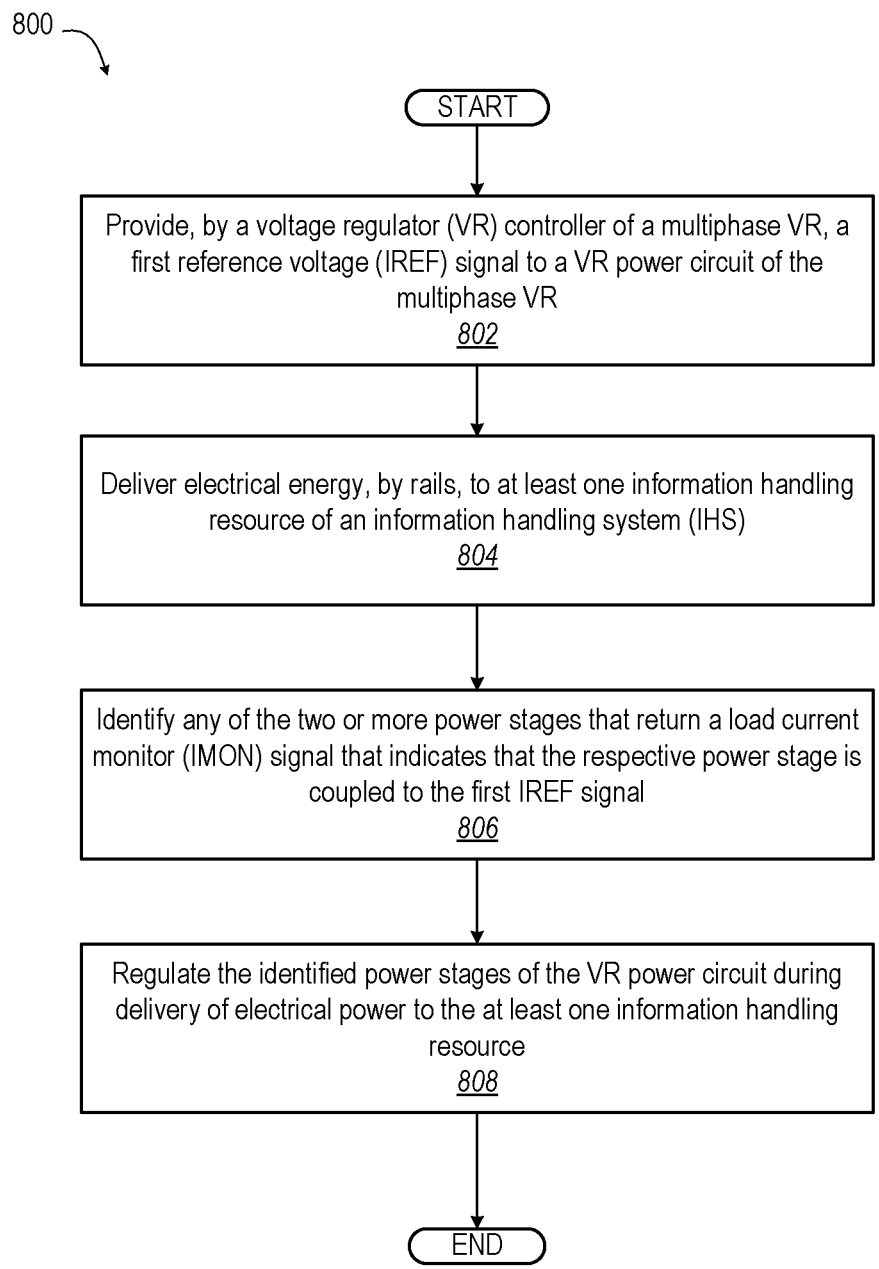
FIG. 8 illustrates a flow diagram of a method of performing automatic VR phase assignment and configuration for a single output rail, according to one or more embodiments.
Figure 9:
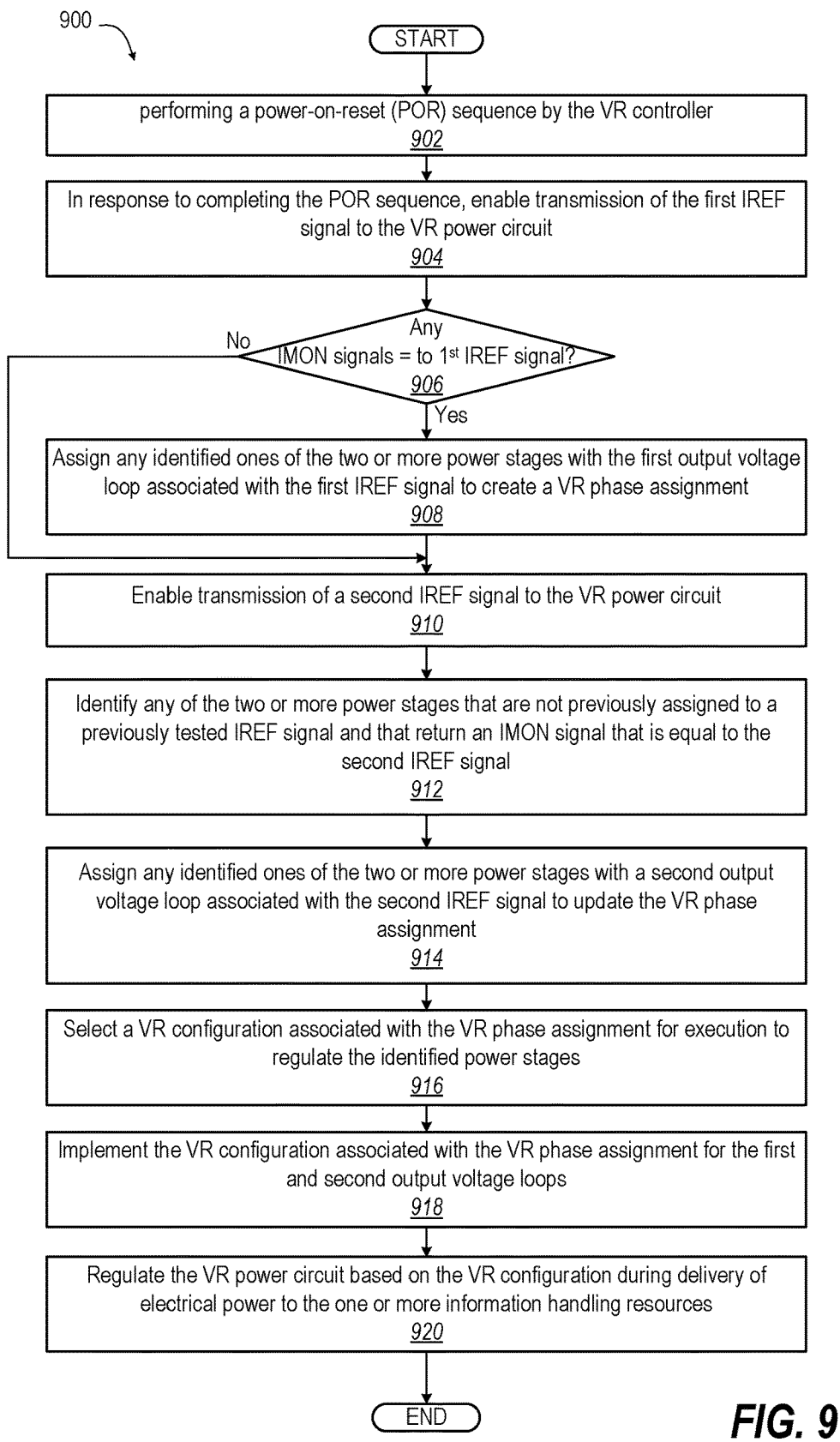
FIG. 9 illustrates a flow diagram of a method of performing automatic VR phase assignment and configuration for multi-output rails, according to one or more embodiments.
Figure 10:
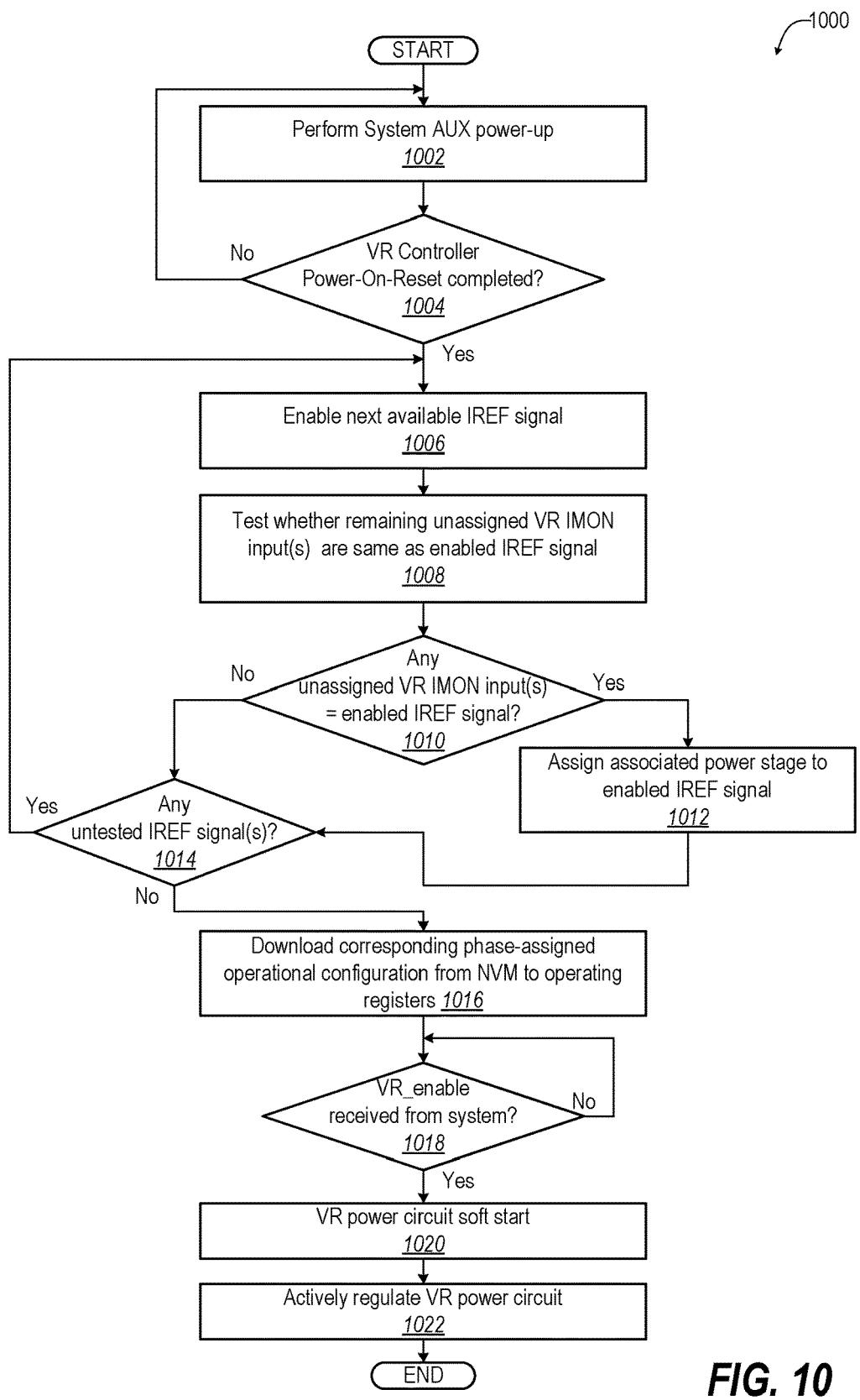
FIG. 10 illustrates a flow diagram of a method of performing automatic VR phase assignment and configuration for a multiphase, multi-loop VR, according to one or more embodiments.

FIGS. 8-10 illustrate flowcharts of exemplary methods 800, 900, 1000 by which VR controller 106 (FIG. 1) and/or an IHS 100 (FIG. 1) performs different aspects of the processes that enable the one or more embodiments of the disclosure. Generally, methods 800, 900, 1000 represent computer-implemented methods. The description of methods 800, 900, 1000 is provided with general reference to the specific components illustrated within FIGS. 1-2. Generally methods 800, 900, 1000 are described as being implemented via VR controller 230 (FIG. 2).

FIG. 8 illustrates a method 800 of performing automatic VR phase assignment and configuration for a single output rail of an Information Handling System (IHS). In one or more embodiments, method 800 begins with providing, by a voltage regulator (VR) controller of a multiphase VR, a first reference voltage (IREF) signal to a VR power circuit of the multiphase VR (block 802). The VR power circuit includes two or more power stages selectably coupled to one or more output voltage connections or rails. The rails deliver electrical energy to at least one information handling resource of an information handling system (IHS) (block 804). The VR controller identifies any of the two or more power stages that return a load current monitor (IMON) signal that indicates that the respective power stage is coupled to the first IREF signal (block 806). Method 800 includes regulating the identified power stages of the VR power circuit during delivery of electrical power to the at least one information handling resource (block 808). The regulation is according to a VR configuration that is selected based on the identified VR phases assigned to a first output voltage loop and associated with the first IREF signal. Then method 800 ends.

FIG. 9 illustrates a method 900 of performing automatic VR phase assignment and configuration for multi-output rails of an IHS. Method 900 begins with performing a power-on-reset (POR) sequence by the VR controller (block 902). In response to completing the POR sequence, method 900 includes enabling transmission of the first IREF signal to the VR power circuit (block 904). The VR controller identifies any of the two or more power stages that return an IMON signal that is equal to the first IREF signal as indicative of being coupled to the first IREF signal (decision block 906). In response to identifying any power stages that return an IMON signal that is equal to the first IREF signals, method 900 includes assigning any identified ones of the two or more power stages with the first output voltage loop associated with the first IREF signal to create a VR phase assignment (block 908). In response to not identifying any power stages that return an IMON signal that is equal to the first IREF signals in decision block 908 or after assigning identified power stages in block 910, method 900 includes enabling, by the VR controller, transmission of a second IREF signal to the VR power circuit (block 910). Method 900 includes identifying any of the two or more power stages that are not previously assigned to a previously tested IREF signal and that return an IMON signal that is equal to the second IREF signal (block 912). The VR controller assigns any identified ones of the two or more power stages with a second output voltage loop associated with the second IREF signal to update the VR phase assignment (block 914). Method 900 includes selecting a VR configuration associated with the VR phase assignment for execution to regulate the identified power stages (block 916). The number of possible or allowed combinations can be determined prior to configuration by the manufacturer or user. The settings of parameters for selected number of phases and their required power characteristics can be captured in a particular configuration of a set of configurations accessible by the VR controller immediately after the POR sequence. The VR controller includes implementing the VR configuration associated with the VR phase assignment for the first and second output voltage loops (block 918). Method 900 includes regulating the VR power circuit based on the VR configuration during delivery of electrical power to the one or more information handling resources (block 920). Then method 900 ends.

In one or more embodiments, the one or more information handling resources includes a central processing unit CPU) core die powered by the first output voltage loop and a secondary processor core die that is powered by the second output voltage loop. The CPU core die is selectively provisioned with a particular type of CPU. The secondary processor core die is one of: (i) left unprovisioned; and (ii) provisioned with a secondary processor that has power requirements compatible with the particular type of CPU provisioned in the CPU core die. In a particular embodiment, the IHS has a circuit board assembly including circuit board substrate attached to the CPU and secondary processor core dies. The printed circuit substrate has a first voltage plane in electrical communication with the CPU core die to provide electrical power from the first output voltage loop to a CPU that is provisioned in the CPU core die. The circuit board substrate has a second voltage plane in electrical communication with the secondary processor core die to provide electrical power from the second output voltage loop to any secondary processor that is provisioned in the secondary processor core die. The circuit board assembly includes a connection mechanism that selectively: (i) electrically connects an IREF signal to each power stage; and (ii) electrically connects the output voltage connection of each power stage to one of the first and second voltage planes.

In one or more exemplary embodiments, each power stage of the VR power circuit is a synchronous buck converter that includes (i) an inductor electrically connected between a phase node and an output node; (ii) a capacitor electrically connected between the output node and ground; (iii) a high side (HS) control switch electrically connected between a power supply and the phase node; (iv) a low side (LS) synchronous switch electrically connected between a ground and the phase node; (v) a load current sensor electrically connected to the phase node to detect an IMON value; and (vi) a driver that switches the HS control switch and LS synchronous switch according to a received pulse width modulation (PWM) signal. The VR controller produces one or more PWM signals. The VR controller is electrically connected with the HS control switch and the LS synchronous switch via the connection mechanism and the driver. The VR controller is in electrical communication with the load current sensor and the output voltage sensor. The VR controller regulates the VOUT value across the capacitor during delivery of electrical power by the VR controller by PWM control switching of a synchronous buck converter. The PWM control switches on and off the HS control switch and the LS synchronous switch, to cause an inductor current ripple through the inductor.

FIG. 10 illustrates a method 1000 of automatically detecting and configuring an M-phase, N-loop voltage regulator. In one or more embodiments, method 1000 begins by performing system auxiliary (AUX) power-up (block 1002). VR controller makes a determination of whether power-on-reset (POR) sequence has completed (decision block 1004). In response to determining that the POR sequence has not completed, method 1000 returns to block 1002 to continue powering up. In response to determining that the POR sequence has completed, method 1000 detects and configures voltage regulation automatically by enabling the next available IREF signal from 1 to M IREF signals (block 1006). VR controller tests whether any remaining unassigned VR IMON input(s) from a corresponding power stage indicates that the corresponding power stage is connected to the enabled IREF signal. In an exemplary embodiment, this indication is based on the VR IMON input(s) being the same as the enabled IREF signal (block 1008). Method 1000 includes determining whether any unassigned VR IMON input(s) are equal to the enabled IREF signal (decision block 1010). In response to determining that there are unassigned VR IMON input(s) equal to the enabled IREF signal, then method 100 includes assigning the associated power stage to the voltage loop of the enabled IREF signal (block 1012). In response to determining in decision block 1010 that there are no unassigned VR IMON input(s) that are equal to the enabled IREF signal or after completing the assigning in block 1012, VR controller makes a further determination of whether any untested IREF signal(s) remain (decision block 1014). In response to determining that there are untested IREF signal(s) remaining, method 1000 returns to block 1006 to test the next IREF signal. In response to determining that there are no untested IREF signals remaining, method 1000 includes downloading a corresponding phase-assigned operational configuration from NVM to operating registers (block 1016). Then, VR controller determines whether a VR enable trigger is received from the system (decision block 1018). In response to determining that the VR enable trigger is not received, method 1000 returns to block 1018 to continue waiting for VR enable trigger. In response to determining that the VR enable trigger is received, VR controller performs a soft start of the VR power circuit of the multiphase regulator (block 1020). Method 1000 includes actively regulating the VR power circuit (block 1022). Then method 1000 ends.

In the above described flow charts of FIG. 8-10, one or more of the methods may be embodied in VR controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising:
   at least one information handling resource; and
   a multiphase voltage regulator (VR) comprising:
   a VR power circuit including two or more power stages selectably coupled to one or more output voltage connections that deliver electrical energy to the at least one information handling resource; and
   a VR controller coupled to the VR power circuit, and which:
   provides a first reference voltage (IREF) signal to at least one power stage of the VR power circuit;
   identifies any of the two or more power stages that return a load current monitor (IMON) signal that indicates that the respective power stage is coupled to the first IREF signal; and
   regulates the identified power stages from among the two or more power stages of the VR power circuit during delivery of electrical power to the at least one information handling resource according to a VR configuration that is selected based on identified VR phases, which are assigned to a first output voltage loop and associated with the first IREF signal.

2. The IHS of claim 1, wherein the VR controller:
   performs a power-on-reset (POR) sequence;
   in response to completing the POR sequence, enables transmission of the first IREF signal to the VR power circuit;
   identifies any of the two or more power stages that return an IMON signal that is equal to the first IREF signal as indicative of being coupled to the first IREF signal;
   assigns any identified ones of the two or more power stages with the first output voltage loop associated with the first IREF signal to create a VR phase assignment; and
   selects the VR configuration associated with the VR phase assignment for execution to regulate the identified power stages.

3. The IHS of claim 2, wherein the VR controller:
   enables transmission of a second IREF signal to the VR power circuit;
   identifies any of the two or more power stages that are not previously assigned to a previously tested IREF signal and that return an IMON signal that is equal to the second IREF signal;
   assigns any of the two or more power stages that are not previously assigned with a second output voltage loop associated with the second IREF signal to update the VR phase assignment;
   implements the VR configuration associated with the VR phase assignment for the first and second output voltage loops; and
   regulates the VR power circuit based on the VR configuration during delivery of electrical power to the one or more information handling resources.

4. The IHS of claim 3, wherein the one or more information handling resources comprises a central processing unit (CPU) core die powered by the first output voltage loop and a secondary processor core die that is powered by the second output voltage loop, the CPU core die being selectively provisioned with a particular type of CPU, and the secondary processor core die being one of: (i) left unprovisioned; and (ii) provisioned with a secondary processor that has power requirements compatible with the particular type of CPU provisioned in the CPU core die.

5. The IHS of claim 4, further comprising:
   a printed circuit board attached to the CPU and secondary processor core dies and comprising:
   a first voltage plane in electrical communication with the CPU core die to provide electrical power from the first output voltage loop to a CPU that is provisioned in the CPU core die;
   a second voltage plane in electrical communication with the secondary processor core die to provide electrical power from the second output voltage loop to any secondary processor that is provisioned in the secondary processor core die; and a connection mechanism that selectively: (i) electrically connects an IREF signal to each power stage; and (ii) electrically connects the output voltage connection of each power stage to one of the first and second voltage planes.

6. The IHS of claim 1, wherein:
each power stage comprises:
an inductor electrically connected between a phase node and an output node;
a capacitor electrically connected between the output node and ground;
a high side (HS) control switch electrically connected between a power supply and the phase node;
a low side (LS) synchronous switch electrically connected between a ground and the phase node;
a load current sensor electrically connected to the phase node to detect an IMON value; and
a driver that switches the HS control switch and LS synchronous switch according to a received pulse width modulation (PWM) signal; and
the VR controller produces one or more PWM signals, is electrically connected with the HS control switch and the LS synchronous switch via a connection mechanism and the driver, and is in electrical communication with the load current sensor and an output voltage sensor, the VR controller regulating the VOUT value across the capacitor during delivery of electrical power by switching on and off the HS control switch and the LS synchronous switch with a particular PWM signal to cause an inductor current ripple through the inductor.

7. The IHS of claim 1, wherein: the VR phase assignments execute to regulate identified power stages; a number of possible combinations are determined; and settings of parameters for selected number of phases and a corresponding required power characteristics are captured in a particular configuration of a set of configurations that are accessible by the VR controller immediately after a power on reset sequence.

8. A circuit board assembly comprising:
a circuit board substrate;
at least one information handling resource of an information handling system (IHS) attached to the circuit board substrate;
a multiphase voltage regulator (VR) comprising:
a VR power circuit including of two or more power stages selectably coupled to one or more output voltage connections that deliver electrical energy to the at least one information handling resource; and
a VR controller coupled to the VR power circuit, and which:
provides a first reference voltage (IREF) signal to at least one power stage of the VR power circuit;
identifies any of the two or more power stages that return a load current monitor (IMON) signal that indicates that the respective power stage is coupled to the first IREF signal; and
regulates the identified power stages from among the two or more power stages of the VR power circuit during delivery of electrical power to the at least one information handling resource according to a VR configuration that is selected based on identified VR phases, which are assigned to a first output voltage loop and associated with the first IREF signal.

9. The circuit board assembly of claim 8, wherein the VR controller:

performs a power-on-reset (POR) sequence;
in response to completing the POR sequence, enables transmission of the first IREF signal to the VR power circuit;
identifies any of the two or more power stages that return an IMON signal that is equal to the first IREF signal as indicative of being coupled to the first IREF signal;
assigns any identified ones of the two or more power stages with the first output voltage loop associated with the first IREF signal to create a VR phase assignment; and
selects the VR configuration associated with the VR phase assignment for execution to regulate the identified power stages.

10. The circuit board assembly of claim 9, wherein the VR controller:
enables transmission of a second IREF signal to the VR power circuit;
identifies any of the two or more power stages that are not previously assigned to a previously tested IREF signal and that return an IMON signal that is equal to the second IREF signal;
assigns any of the two or more power stages that are not previously assigned with a second output voltage loop associated with the second IREF signal to update the VR phase assignment;
implements the VR configuration associated with the VR phase assignment for the first and second output voltage loops; and
regulates the VR power circuit based on the VR configuration during delivery of electrical power to the one or more information handling resources.

11. The circuit board assembly of claim 10, wherein the one or more information handling resources comprises a central processing unit (CPU) core die powered by the first output voltage loop and a secondary processor core die that is powered by the second output voltage loop, the CPU core die being selectively provisioned with a particular type of CPU, and the secondary processor core die being one of: (i) left unprovisioned; and (ii) provisioned with a secondary processor that has power requirements compatible with the particular type of CPU provisioned in the CPU core die.

12. The circuit board assembly of claim 11, further comprising:
a first voltage plane attached to the circuit board substrate and in electrical communication with the CPU core die to provide electrical power from the first output voltage loop to a CPU that is provisioned in the CPU core die;
a second voltage plane attached to the circuit board substrate and in electrical communication with the secondary processor core die to provide electrical power from the second output voltage loop to any secondary processor that is provisioned in the secondary processor core die; and
a connection mechanism that selectively: (i) electrically connects an IREF signal to each power stage; and (ii) electrically connects the output voltage connection of each power stage to one of the first and second voltage planes.

13. The circuit board assembly of claim 8, wherein:
each power stage comprises:
an inductor electrically connected between a phase node and an output node;
a capacitor electrically connected between the output node and ground;

a high side (HS) control switch electrically connected between a power supply and the phase node;
a low side (LS) synchronous switch electrically connected between a ground and the phase node;
a load current sensor electrically connected to the phase node to detect an IMON value; and
a driver that switches the HS control switch and LS synchronous switch according to a received pulse width modulation (PWM) signal; and
the VR controller produces one or more PWM signals, is electrically connected with the HS control switch and the LS synchronous switch via a connection mechanism and the driver, and is in electrical communication with the load current sensor and an output voltage sensor, the VR controller regulating the VOUT value across the capacitor during delivery of electrical power by switching on and off the HS control switch and the LS synchronous switch with a particular PWM signal to cause an inductor current ripple through the inductor.

14. The circuit board assembly of claim 8, wherein: the VR phase assignments execute to regulate identified power stages; a number of possible combinations are determined; and settings of parameters for selected number of phases and a corresponding required power characteristics are captured in a particular configuration of a set of configurations that are accessible by the VR controller immediately after a power on reset sequence.

15. A method comprising:
providing, by a voltage regulator (VR) controller of a multiphase VR, a first reference voltage (IREF) signal to at least one power stage of a VR power circuit of the multiphase VR comprised of two or more power stages selectably coupled to one or more output voltage connections that deliver electrical energy to at least one information handling resource of an information handling system (IHS);
identifying any of the two or more power stages that return a load current monitor (IMON) signal that indicates that the respective power stage is coupled to the first IREF signal; and
regulating the identified power stages from among the two or more power stages of the VR power circuit during delivery of electrical power to the at least one information handling resource according to a VR configuration that is selected based on identified VR phases, which are assigned to a first output voltage loop and associated with the first IREF signal.

16. The method of claim 15, further comprising:
performing a power-on-reset (POR) sequence by the VR controller;
in response to completing the POR sequence, enabling transmission of the first IREF signal to the VR power circuit;
identifying any of the two or more power stages that return an IMON signal that is equal to the first IREF signal as indicative of being coupled to the first IREF signal;
assigning any identified ones of the two or more power stages with the first output voltage loop associated with the first IREF signal to create a VR phase assignment; and
selecting the VR configuration associated with the VR phase assignment for execution to regulate the identified power stages.

17. The method of claim 16, further comprising:
enabling transmission of a second IREF signal to the VR power circuit;
identifying any of the two or more power stages that are not previously assigned to a previously tested IREF signal and that return an IMON signal that is equal to the second IREF signal;
assigning any of the two or more power stages that are not previously assigned with a second output voltage loop associated with the second IREF signal to update the VR phase assignment;
implementing the VR configuration associated with the VR phase assignment for the first and second output voltage loops; and
regulating the VR power circuit based on the VR configuration during delivery of electrical power to the one or more information handling resources.

18. The method of claim 17, wherein the one or more information handling resources comprises a central processing unit (CPU) core die powered by the first output voltage loop and a secondary processor core die that is powered by the second output voltage loop, the CPU core die being selectively provisioned with a particular type of CPU, and the secondary processor core die being one of: (i) left unprovisioned; and (ii) provisioned with a secondary processor that has power requirements compatible with the particular type of CPU provisioned in the CPU core die.

19. The method of claim 18, wherein the IHS comprises a circuit board assembly that includes a circuit board substrate attached to the CPU and secondary processor core dies, the circuit board assembly comprises:
a first voltage plane in electrical communication with the CPU core die to provide electrical power from the first output voltage loop to a CPU that is provisioned in the CPU core die; and
a second voltage plane in electrical communication with the secondary processor core die to provide electrical power from the second output voltage loop to any secondary processor that is provisioned in the secondary processor core die; and
the circuit board assembly comprises a connection mechanism that selectively: (i) electrically connects an IREF signal to each power stage; and (ii) electrically connects the output voltage connection of each power stage to one of the first and second voltage planes.

20. The method of claim 15, wherein:
each power stage comprises:
an inductor electrically connected between a phase node and an output node;
a capacitor electrically connected between the output node and ground;
a high side (HS) control switch electrically connected between a power supply and the phase node;
a low side (LS) synchronous switch electrically connected between a ground and the phase node;
a load current sensor electrically connected to the phase node to detect an IMON value; and
a driver that switches the HS control switch and LS synchronous switch according to a received pulse width modulation (PWM) signal; and
the VR controller produces one or more PWM signals, is electrically connected with the HS control switch and the LS synchronous switch via a connection mechanism and the driver, and is in electrical communication with the load current sensor and an output voltage sensor; and the method further comprises regulating the VOUT value across the capacitor during delivery of electrical power by the VR controller switching on and off the HS control switch and the LS synchronous switch with a particular PWM signal to cause an inductor current ripple through the inductor.

\* \* \* \* \*